United States Patent [19]

Watanabe et al.

[11] Patent Number: 5,526,420
[45] Date of Patent: Jun. 11, 1996

[54] COMMUNICATION APPARATUS

[75] Inventors: Tsunehiro Watanabe, Tokyo; Hisao Terajima, Yokohama; Kozo Toda, Yokohama; Teruyuki Nishii, Yokohama, all of Japan

[73] Assignee: Canon Kabushiki Kaisha, Tokyo, Japan

[21] Appl. No.: 285,524

[22] Filed: Aug. 4, 1994

Related U.S. Application Data

[63] Continuation of Ser. No. 739,246, Aug. 1, 1991, abandoned.

[30] Foreign Application Priority Data

Aug. 3, 1990 [JP] Japan .................................. 2-204986
Aug. 30, 1990 [JP] Japan .................................. 2-229680

[51] Int. Cl.[6] ............................................. H04M 3/22
[52] U.S. Cl. .......................... 379/378; 379/67; 379/100; 379/88
[58] Field of Search ................................ 379/378, 100, 379/377, 97, 98, 372, 399, 70, 80, 67, 68

[56] References Cited

U.S. PATENT DOCUMENTS

| | | | |
|---|---|---|---|
| 3,903,375 | 9/1975 | DeWit | 379/378 |
| 4,118,597 | 10/1978 | Proctor et al. | 379/378 |
| 4,132,864 | 1/1979 | Feng | 379/377 |
| 4,278,939 | 7/1981 | Henry | 379/378 X |
| 4,300,021 | 11/1981 | Van Husen | 379/378 |
| 4,639,553 | 1/1987 | Kiguchi | 379/377 |
| 4,800,439 | 1/1989 | Yoshino | 358/257 |
| 4,811,385 | 3/1989 | Watanabe | 379/100 |
| 4,821,312 | 4/1989 | Horton et al. | 379/97 |
| 4,837,813 | 6/1989 | Terajima | 379/113 |
| 4,868,865 | 8/1989 | Ogawa et al. | 379/100 |
| 4,878,123 | 10/1989 | Miura et al. | 358/401 |
| 4,897,831 | 1/1990 | Negi et al. | 370/29 |
| 4,932,048 | 6/1990 | Kenmochi et al. | 379/67 |
| 4,939,772 | 7/1990 | Goto | 379/100 X |
| 4,947,423 | 8/1990 | Watanabe | 379/353 |
| 5,018,189 | 5/1991 | Kurasawa | 379/93 |
| 5,020,096 | 5/1991 | Sakakibara et al. | 379/100 |
| 5,036,534 | 7/1991 | Gural | 379/67 |
| 5,131,026 | 7/1992 | Park | 379/100 |

*Primary Examiner*—Jeffery Hofsass
*Assistant Examiner*—Jacques M. Saint-Surin
*Attorney, Agent, or Firm*—Fitzpatrick, Cella, Harper & Scinto

[57] ABSTRACT

There is disclosed a control circuit for switching between a facsimile unit and an automatic answering telephone unit. A current detecting circuit with satisfactory linearity between the mutually insulated input and output sides is used for detecting a DC current on a communication line, indicating a communication state of the telephone unit and also for detecting an AC signal, representing a speech communication signal and used for recording an incoming message in the automatic answering telephone unit. This structure allows to insulate the recording circuit and the facsimile circuit from the communication line without a transformer, thereby reducing cost and dimension of the apparatus.

30 Claims, 7 Drawing Sheets

COMMUNICATION APPARATUS

This application is a continuation of application Ser. No. 07/739,246 filed Aug. 1, 1991, now abandoned.

BACKGROUND OF THE INVENTION

1. Field of the Invention

The present invention relates to a communication apparatus capable of detecting for example the state of a communication line and effecting communication according to the result of said detection.

2. Related Background Art

In such technical field, there is already known, for example, a facsimile apparatus which is connected to a telephone line and which includes a line (network) control unit, a reader unit for reading an image, a recorder unit for recording an image, a modem unit for modulation/demodulation of signals, etc.

Also there is popularly used an automatic answering telephone apparatus (or message phone apparatus) which is likewise connected to a telephone line and is provided with an outgoing message (OGM) transmitting unit for effecting automatic call reception in the absence of a receiver and sending an outgoing message for requesting the message recording to a caller, and an incoming message (ICM) recording/reproducing unit for recording an incoming message from the caller in response to said OGM and reproducing said ICM afterwards.

Such automatic answering telephone apparatus is generally so designed as to be capable of recording and reproducing ordinary speech done by a user through the communication line when he is present at home, by means of the ICM recording/reproducing unit.

Also in recent years, there has been commercialized facsimile apparatus with automatic answering telephone function (or message phone function), in which a facsimile mechanism, an auto answering mechanism, a speech communication mechanism and a line control unit for connecting these mechanisms with the line are integrally constructed.

FIG. 3 illustrates such apparatus in a block diagram, wherein a line control unit NC and a speech communication unit CC (primary circuits) are separated by transformers from a message recorder unit RC and a facsimile machine FC (secondary circuits). Thus, in case of speech communication recording in which the speech by the speech communication unit CC is recorded, the speech by said unit CC is transmitted through a transformer to the message recorder unit RC and recorded therein.

In such apparatus, however, the speech through the speech communication unit is recorded, and a transformer is required merely for recording the speech. Also, such speech recording is not possible if the speech communication unit is not equipped together.

Also there is known a facsimile apparatus in which an answering telephone automatically responds to an incoming call, and then the communication is switched to facsimile if a caller is a facsimile apparatus.

The network control unit of such apparatus is constructed as shown in FIG. 4, wherein terminals L1, L2 are connected to a telephone line, and terminals T1, T2 are connected to an automatic answering telephone (message phone). There is provided a CML (connect line to modem) relay which connects the telephone line to the answering telephone or to the modem for facsimile communication.

Said CML relay 301 is connected to the message phone (contacts a) in the stand-by state.

A call signal Ci, arriving from the telephone line in said stand-by state, enters the message phone through a current sensor 320. Upon detecting said Ci signal, the message phone effects automatic response (or occupies the line), whereby a DC current of several ten milliampere flows in the current sensor 320, consisting for example of a photocoupler composed of an LED (light-emitting diode) and a phototransistor. If a caller is a facsimile apparatus, a call tone signal-CNG is superposed with said DC current. Said CNG signal is supplied, through a DC intercepting capacitor 303, a transformer 304 and an amplifier 305, to a terminal ACDET.

A control unit of the facsimile apparatus, upon detection of a DC current from a terminal DCDET indicating the response by the message phone, detects the frequency of the signal released from the ACDET terminal, and switches the CML relay to the modem for facsimile communication if the detected signal is identified as the CNG signal of 1100 Hz.

In the above-explained apparatus, however, the transformer 304 has been the obstacle to compactization.

Since the CNG signal current is overlaid on the DC current, it has been proposed to detect both currents by the current sensor 320, but the detection of the CNG signal is sometimes difficult depending on the resistance of the line or the impedance of the telephone, since the photocoupler composed of LED and phototransistor shows considerable fluctuation in the current transmission rate and has a narrow range for realizing linear transmission of the CNG signal.

In the field of facsimile apparatus with automatic answering (or message recording) function, the present applicant already made proposals in the U.S. Pat. No. 4,800,439 and the U.S. patent application Ser. No. 49,948 filed May 15, 1987, but such proposals are not to resolve the above-explained drawbacks.

SUMMARY OF THE INVENTION

In consideration of the foregoing, an object of the present invention is to provide an improvement in the communication apparatus.

Another object of the present invention is to simplify a structure of apparatus by effecting the detection of a line status and the pick-up of a voice band signal from a line.

Still another object of the present invention is to achieve simplification of structure, cost reduction and compactization of an apparatus by effecting detection of a DC current and detection of a voice band signal with a single current detecting circuit of which output and input are mutually insulated and which has satisfactory linearity between the input and output.

Still other objects of the present invention will become apparent from the following description of embodiments to be taken in conjunction with the attached drawings.

DETAILED DESCRIPTION OF THE PREFERRED EMBODIMENTS

Now the present invention will be clarified in detail by embodiments shown in the attached drawings.

Figure 1:
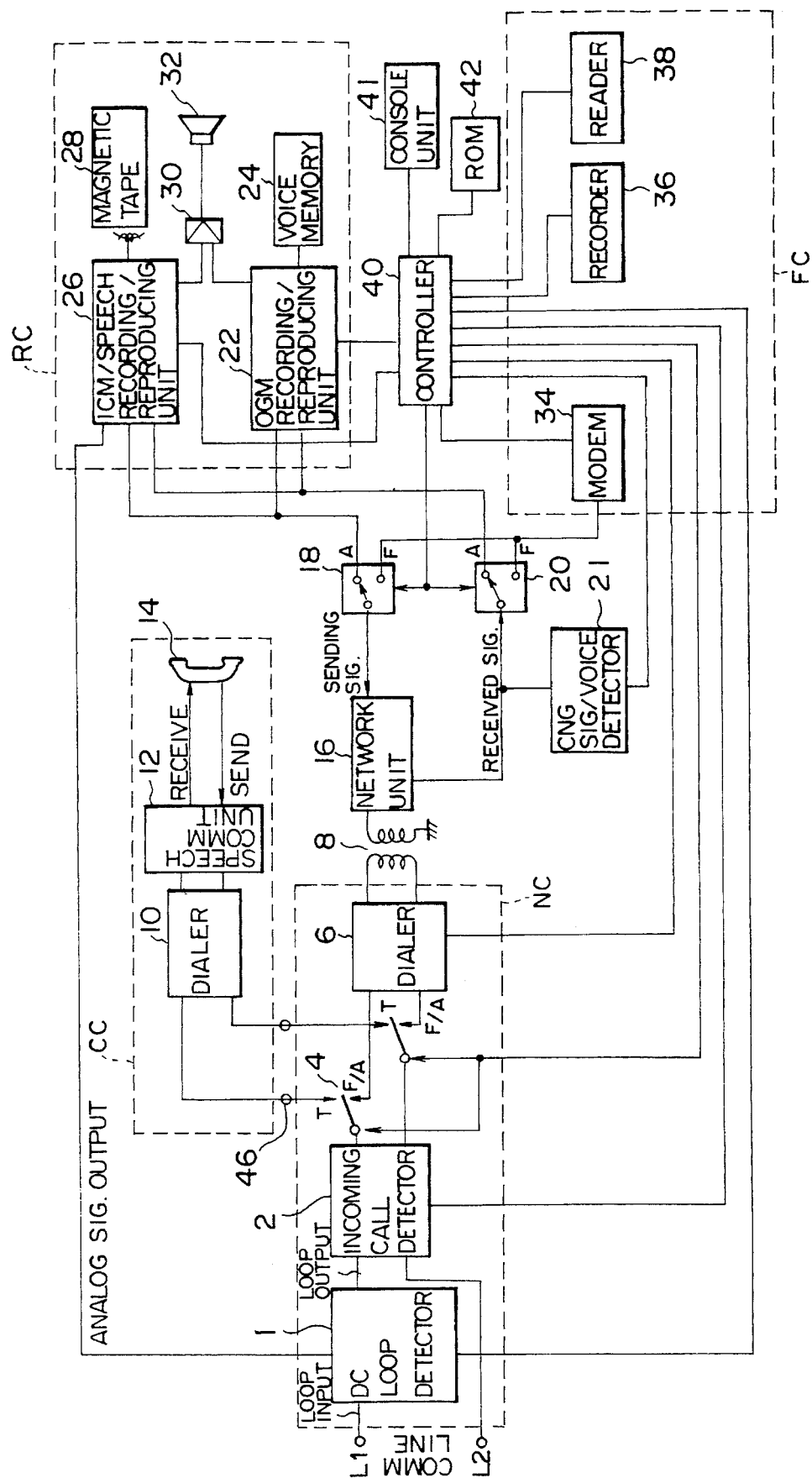
FIG. 1 is a block diagram of a facsimile apparatus constituting a first embodiment.

FIG. 1 shows a facsimile apparatus of a first embodiment in a block diagram.

The facsimile apparatus includes an automatic answering telephone (message phone) and is composed of a network control unit NC, a speech communication unit CC, a message recording unit RC and a facsimile circuit FC.

The network control unit NC is provided with a DC loop/polarity inversion detector 1 for detecting a DC loop current in case a DC loop is formed by accessing a communication line or detecting the polarity inversion in case the polarity of the DC loop current is inverted in response to an issued call; an incoming call detector 2 for detecting a call from the line; a relay 4 for switching between a speech mode and a facsimile transmission/reception mode or a message telephone mode (message recording mode); and a dialer 6 for dialing in facsimile transmission.

The speech communication unit CC is provided with a dialer 10 for dialing in speech communication by an operator; a speech communication circuit 12 for controlling speech received from the line and speech emitted by the operator in speech communication; and a handset 14 including a microphone and a receiver for speech communication.

In the present embodiment, a connection part 46 between the network control unit NC and the speech communication unit CC is composed for example of a connector and is rendered detachable.

The network control unit NC is connected to a transformer 8 which separates a secondary circuit from a line side and to which is connected a network unit 16 for matching by 2–4 wire conversion between the line side (2-wire circuit) and the transmission/reception signal circuit (4-wire circuit). The network unit 16 exchanges transmission/reception signals with the recorder unit RC and the facsimile circuit FC.

The recorder unit RC or the facsimile circuit FC is selected by switches 18, 20. Also the reception signal released from the network unit 16 is supplied, in the message telephone mode or in the facsimile mode, to a detector 21 for detecting a signal from the line or detecting a voice.

The recorder unit RC is provided with following components.

An OGM recording/reproducing unit 22 stores an OGM (outgoing message) recorded in advance by the operator and reproduces said outgoing message in the message telephone mode, thereby requesting a caller to record an ICM (incoming message). In the present embodiment, said OGM recording/reproducing unit has a speech IC capable of digitalizing an analog voice signals to store in the form of digital data. A voice memory 24 is provided for storing said voice signals in the form of digital data.

An ICM/speech recording/reproducing unit 26 records an ICM (incoming message) from the caller in response to the OGM in the message telephone mode, or contents of the speech through the speech communication unit in the speech recording mode, and reproduces these messages afterwards. In the present embodiment, the recording and reproduction of the ICM or the contents of the speech are conducted by a magnetic tape. There are provided a magnetic tape 28, such as a microcassette, for recording said ICM and the speech; an amplifier 30 for amplifying a reproduced signal from said recording/reproducing unit; and a speaker 32 for releasing the amplified signal is an audible sound.

The facsimile circuit FC is provided with a modem 34 for modulation/demodulation between an analog signal on the line and a digital image signal in the facsimile communication; a recorder 36 for recording a received image in facsimile reception; and a reader 38 for reading an original image in facsimile transmission.

There are further provided a controller 40 for controlling the above-mentioned sections; a ROM 42 storing control programs for the controller 40; and a console unit 41 to be operated by the operator.

Figure 2:
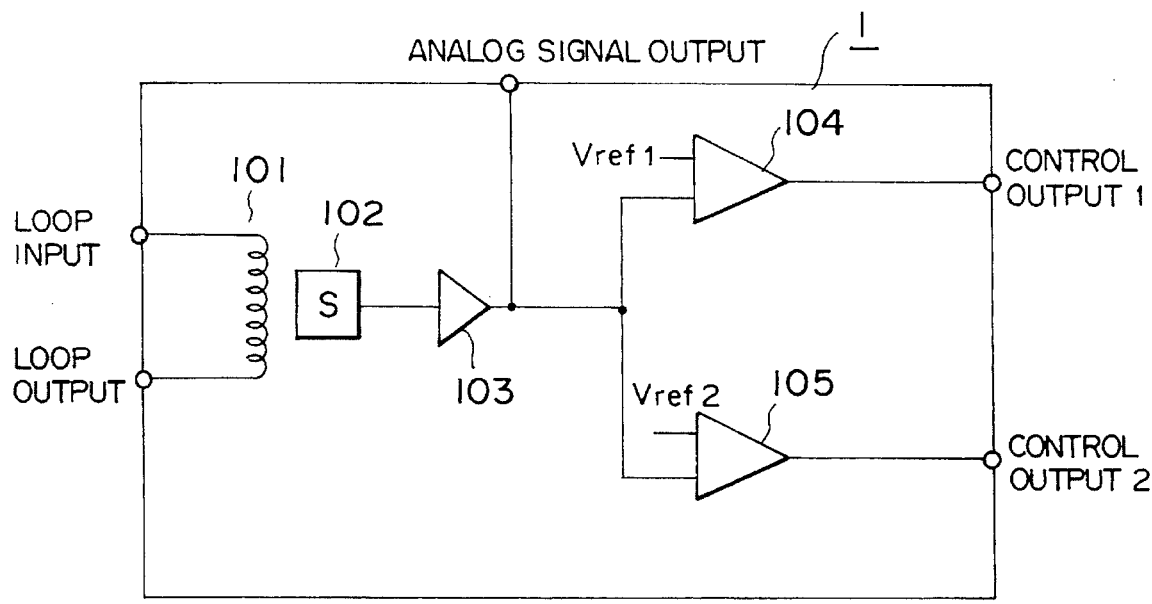
FIG. 2 is a detailed diagram of a DC loop/polarity inversion detector in said first embodiment.
Figure 3:
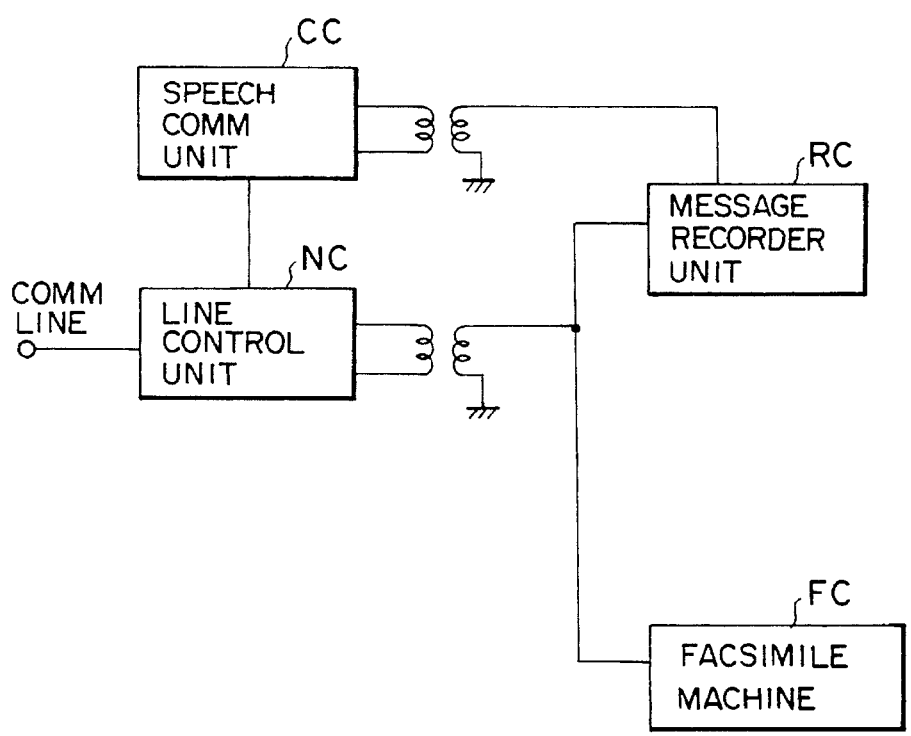
FIGS. 3 and 4 are block diagrams of conventional facsimile apparatus.
Figure 4:
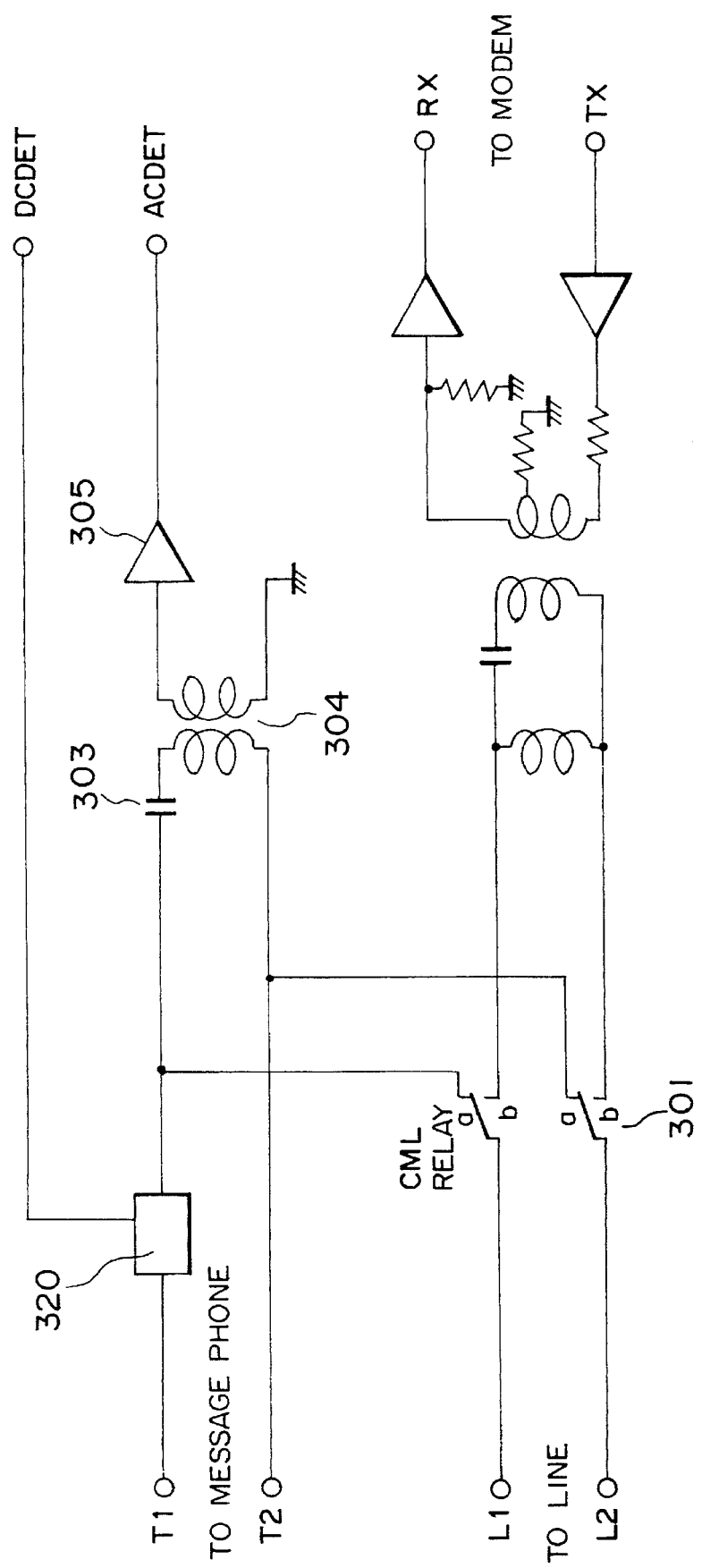

Now reference is made to FIG. 2, showing the details of the DC loop/polarity inversion detector 1 shown in FIG. 1.

A coil 101 is connected to an DC loop of the line and generates a change in a magnetic field in response to a change in a DC loop current. In the vicinity of said coil 101 there is proivded a Hall effect element 102 for detecting said change in the magnetic field.

An output of said Hall effect element 102 is amplified by an amplifier 103 and issued as an analog output signal, corresponding to a value of the DC loop current and having a polarity corresponding to that of said loop.

Comparators 104, 105 compare said analog output signal with reference voltages, thereby outputting digital H- or L-level signal as a control output signal.

Since a polarity of said output signal corresponds to that of the loop, either one of said control output signals 1, 2 varies by a direction of a current in the coil 101.

A structure shown in FIG. 2 provides the presence or absence of the DC loop current and a change in the direction thereof as the control output signals 1, 2, respectively, and an analog change in the DC loop current as an analog output signal.

The above-explained structure functions in the following manner.

The relay 4 is usually set at a side T, whereby the operator can conduct speech communication with the handset 14 upon reception an incoming call or when dialing by the dialer 10 (the speech communication mode).

In case that the facsimile circuit FC is set in a manual reception state, if the operator identifies facsimile reception (by hearing a CNG signal from the caller) after the handset 14 is hooked off in response to an incoming call, the operator operates the console unit 41 to shift to a facsimile reception mode. That is, the controller 40 shifts the relay 4 to a side F/A and changes the switches 18, 20 to contacts F, whereby a received signal is transmitted to the facsimile circuit FC and a received image is recorded by the recorder 36 (the facsimile reception mode).

In case of facsimile transmission of an original, the operator sets the original in the reader 38 and operates dials of the console unit 41, whereby the control unit 40 shifts the relay 4 to the side F/A and changes the switches 18, 20 to the side F. The dialer 10 is actuated to issue a call and the DC loop/polarity inversion detector 1 detects the polarity inversion to identify establishment of the call. Then, the reader 38 reads image data and the read image data is transmitted through the modem 34 (the facsimile transmission mode).

In the message telephone mode, the operator in advance records an outgoing message (OGM) in the voice memory 24 through the OGM recording/reproducing unit 22, by operating the console unit 41.

When going out, the operator selects the message telephone mode by the console unit 41, whereby the switches 18, 20 are set at the side A. When the incoming call detector 2 detects an incoming call, the relay 4 is set at the side F/A and the dialer responds to catch a DC loop.

Then the OGM recording/reproducing unit 22 and the voice memory 24 are activated to transmit the OGM to the caller through the line. If the facsimile circuit is set at automatic reception and the CNG signal/voice detector 21 detects a CNG signal from the caller, the switches 18, 20 are shifted to the side F to effect the facsimile reception in the same manner as explained above.

However, if the CNG signal is not detected, or if the facsimile circuit FC is set at manual reception, the message telephone mode is continued thereafter.

That is, after the transmission of an OGM, the ICM/speech recording/reproducing unit 26 is set for recording a message from the line, and an ICM from the caller through the line is recorded on the magnetic tape 28. When the CNG signal/voice detector 21 detects the absence of voice after completion of speech by the caller, the ICM/speech recording/reproducing unit 26 terminates the recording of the ICM, thereby completing one ICM recording (the message telephone mode).

In each of the above-explained speech communication mode, facsimile reception mode, facsimile transmission mode and message telephone mode, while the present apparatus occupies the line thereby forming a DC loop, the DC loop/polarity inversion detector 1 detects this status. In response thereto, the controller 40 turns on a light-emitting diode of the console unit 41, thereby informing the operator of a line busy state.

In the above-explained apparatus, if the operator wishes to record speech communication by actuating the console unit 41 while the speech communication is conducted utilizing the handset 14, the control unit 40 sets the ICM/speech recording/reproducing unit 26 for recording an analog output signal of the DC loop/polarity inversion detector 1, thereby recording the speech on the magnetic tape 28.

In the speech communication by the speech communication unit CC, each of a voice emitted by the operator and a voice received from a destination is detected by the DC loop/polarity inversion detector 1 as a change in a DC loop current. Said change is converted by the coil 101 in FIG. 2 into a magnetic signal and again converted by the Hall effect element 102 into an analog electrical signal, which is supplied to the ICM/speech recording/reproducing unit 26. Thus the emitted and received voices are recorded on the magnetic tape 28.

When the operator wishes reproduction of the ICM recorded in the message telephone mode or the speech recorded in the communication recording mode, by a predetermined operation of the console unit 41, the control unit 40 sets the ICM/speech recording/reproducing unit 26 for reproduction, thereby reproducing the contents of the messages recorded on the magnetic tape 28.

In the above-explained embodiment, a change in the DC loop current on the line is separated and transmitted to the recorder unit RC for effecting speech recording, so that the speech communication unit is not required to be integrally mounted in the apparatus and an optional speech communication unit may be connected to the apparatus. Stated differently, the speech communication unit CC may be provided as a telephone set or a handset separate from the facsimile apparatus, or even a telephone set made by a different maker from that of the facsimile apparatus may be connected.

The detector 1 integrally has a function of transmitting an analog change in said DC loop current to the recorder unit RC and a function of digitally detecting the presence or absence and the direction of the current by comparisons with comparators, whereby the occupation of the line and the inversion of the magnetic field upon the line occupation can be detected by a same circuit. Thus reduction in cost and space can be attained in comparison with the case in which separate detecting circuits are employed for these purposes.

In the present embodiment, the OGM recording 10 reproducing unit employs a speech IC while the ICM/speech recording/reproducing unit employs a magnetic tape. But recording means for the OGM, ICM and speech may be provided separately or may be united. Also a recording medium may be composed of a suitable combination of the speech IC, the magnetic tape, etc.

In the following there will be explained a second embodiment in which a current sensor which comprises a coil at an input side and a Hall effect element at an output side with the input and output sides being insulated mutually is positioned in such a manner that the input side thereof may be on a current path to the message telephone, a CNG signal is obtained from the output side through a coupling capacitor and an amplifier, whereby a DC signal and a voice band signal can be obtained from a single sensor.

Figure 5:
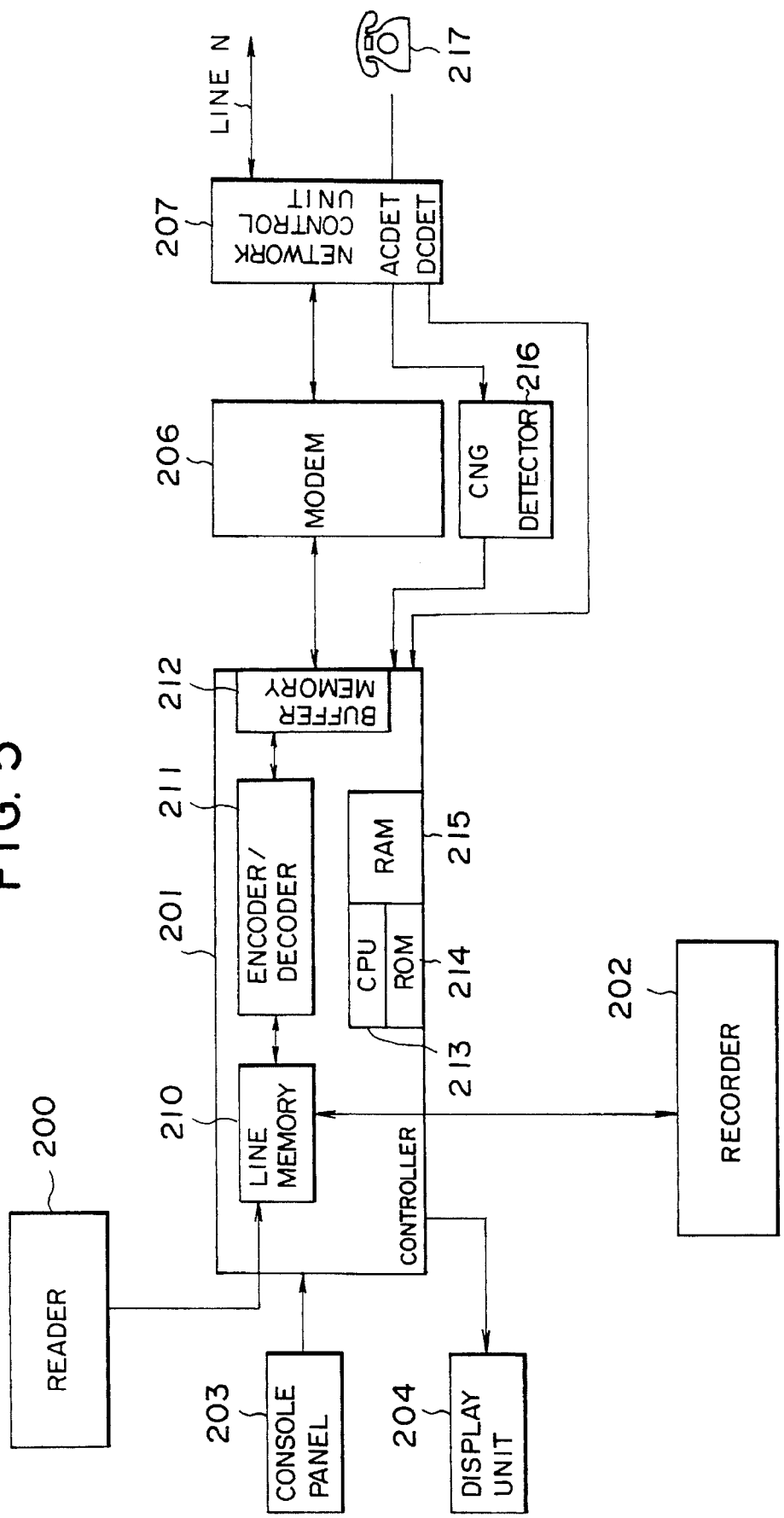
FIG. 5 is a block diagram of a facsimile apparatus constituting a second embodiment.

FIG. 5 is a block diagram of a facsimile apparatus constituting said second embodiment. A controller 201, composed for example of a microprocessor, is provided with a CPU 213, a ROM 214, a RAM 215, a buffer memory 212, a line memory 210 and an encoder/decoder 211, and controls the input and output of an image and the entire communication process.

The ROM 214 stores a control program to be explained later, and the RAM 215 is used as a work area for the CPU 213.

The input and output of an image are conducted by a reader 200 and a recorder 202.

More specifically, original image data is read by the reader 200 composed for example of a CCD (charge-coupled device) sensor and an original transporting system. Received image data or image data read by the reader 200 in a copying mode, is recorded by the recorder 202 composed for example of a thermal printer or an ink jet printer.

The input and output of image data between the reader 200 or the recorder 202 and an encoder/decoder 211 is conducted through the line memory 210 which deals with the data in the unit of a line. Also the input and output of the data between the encoder/decoder 211 and the communication line is conducted through the buffer memory 212 in a larger processing unit, for example a predetermined number of pages. The encoder/decoder 211 effects encoding/decoding for suppressing redundancy, and may be composed of software of the CPU 213.

Connection to and data exchange with a communication line N such as a telephone line are conducted through a modem 206 and a network control unit (NCU) 207, to which connected is a telephone set or a message telephone unit 217 for speech communication and manual control.

A CNG detector 216 is composed of a frequency counter or a band-pass filter, and detects a CNG signal. A console panel 203 is provided with numeral keys for entering telephone numbers, various function keys, and a display unit 204 for displaying the telephone numbers, a time, etc.

Figure 6:
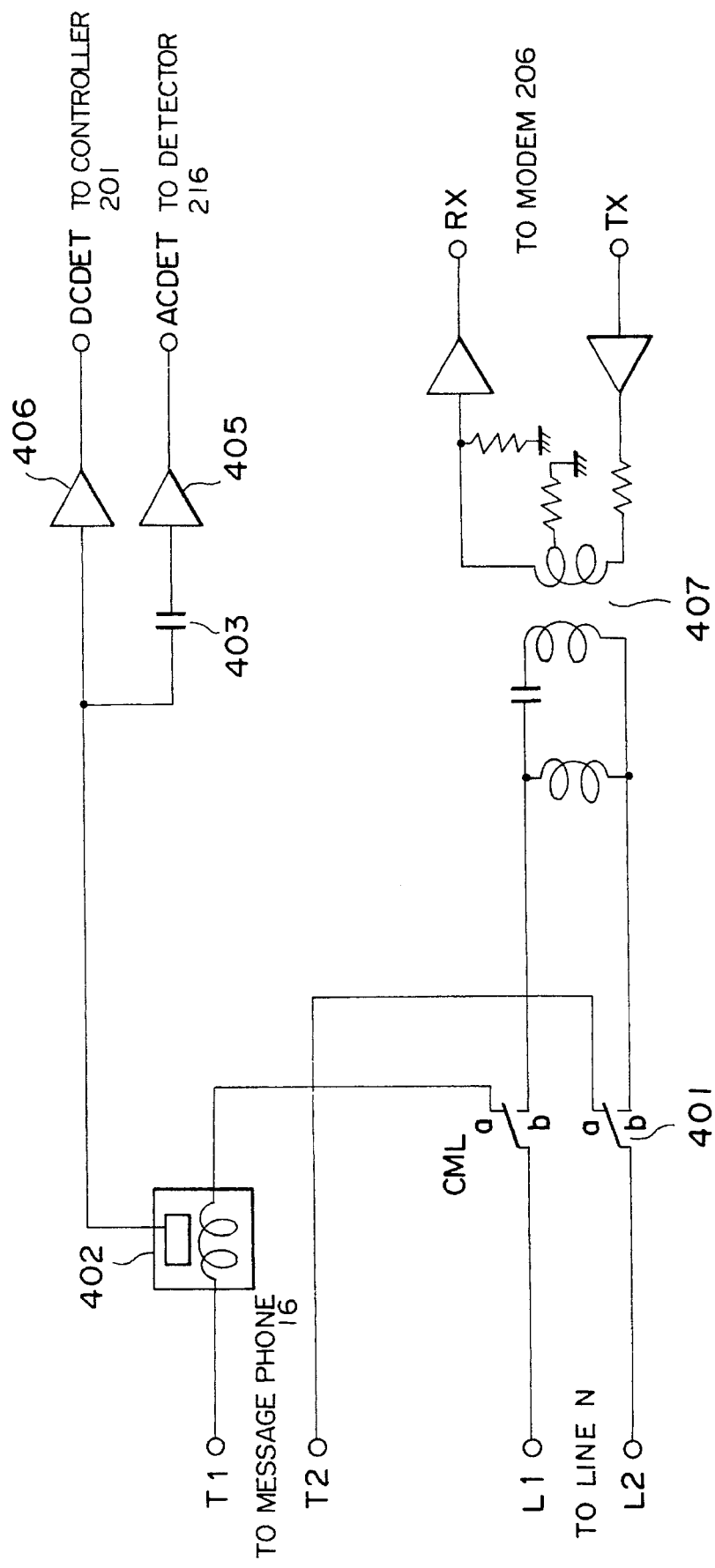
FIG. 6 is a circuit diagram of a network control unit of said second embodiment.

FIG. 6 illustrates the NCU of the present embodiment, in which is provided a CML relay 401. A current sensor 402 is composed of a coil and a Hall effect element positioned close to the coil and insulated from the coil. Said coil generates a magnetic field having an intensity proportional to a current therein, and the Hall effect element converts said magnetic field into a current proportional to the intensity thereof, thereby providing an output current proportional to the coil current. An output of the current sensor 402 is divided into two, one of which is supplied to a comparator 406 to provide a DCDET signal indicating the presence or absence of a DC current. The other is supplied through a DC cut-off capacitor 403 and an amplifier 405 to provide an ACDET signal. A hybrid transformer 407 is provided for 2–4 wire conversion.

Said DCDET signal is supplied to the controller 201, while the ACDET signal is supplied to the CNG detector 216.

In the following there will be explained a message telephone connecting function in the above-explained structure, with reference to FIG. 7.

Figure 7:
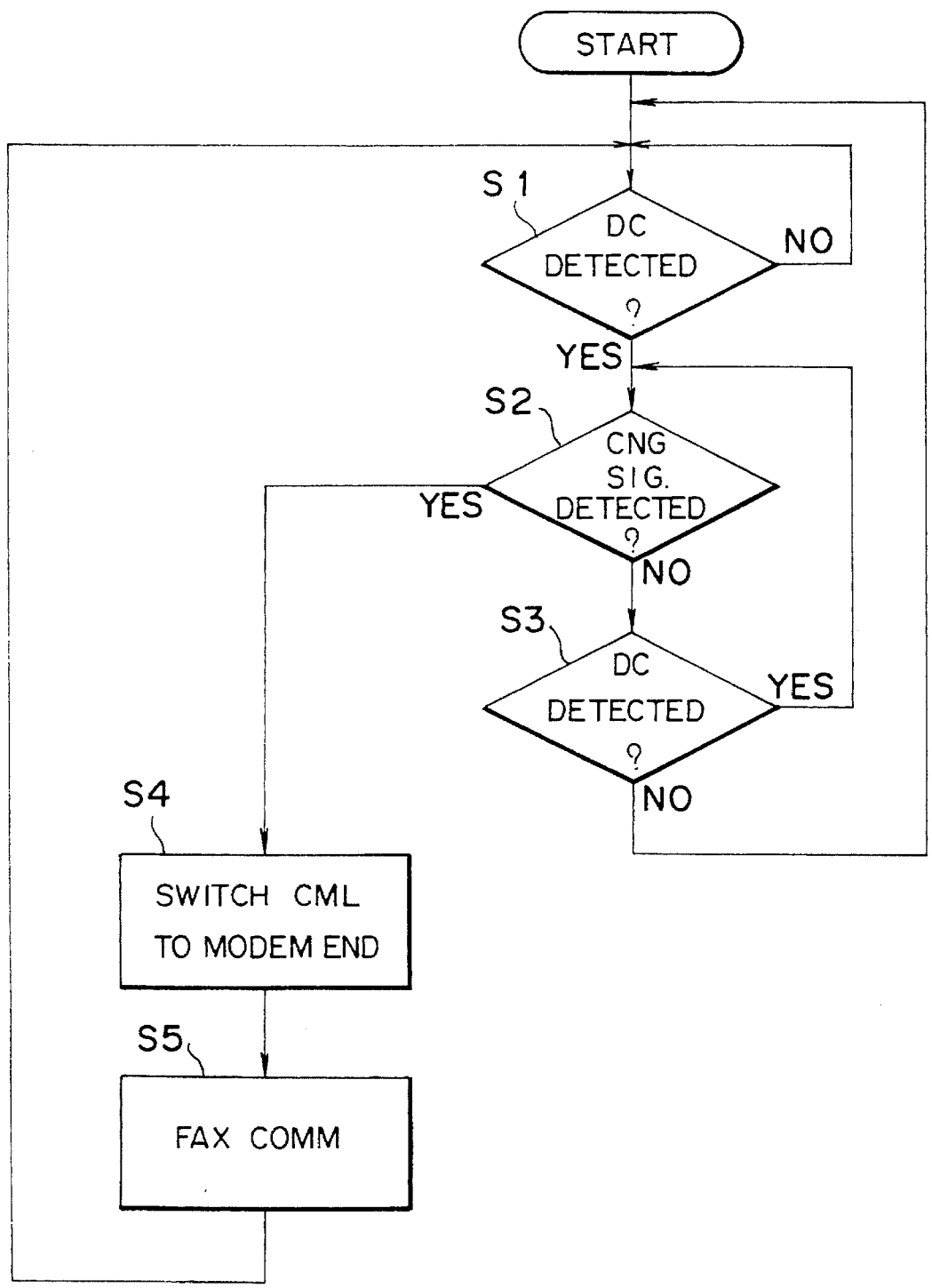
FIG. 7 is a flow chart showing a control sequence of said network control unit.

FIG. 7 is a flow chart showing the control sequence of the controller 201 (or the CPU 213), corresponding to a control program stored in the ROM 214.

In a step S1, the controller 201 examines an output of a DCDET terminal in FIG. 6, and, if a DC current flows in the current sensor 402, the message telephone unit is regarded to have responded and the sequence proceeds to a step S2. If said DC current is not detected, the sequence returns to the step S1 and repeats the above-explained loop (stand-by state). In the step S2, the controller 201 checks an output of the CNG detector 216. If a caller is a facsimile apparatus, a CNG signal therefrom is transmitted through the current sensor 402, the capacitor 403 and the amplifier 405, to the CNG detector 216, thereby turning on an output thereof. Consequently the controller 201 proceeds from the steps S2 to S4, thereby switches the CML relay 401 from a telephone set side to a modem side and initiating facsimile communication.

If the step S2 does not detect the CNG signal, the presence or absence of a DC current is detected in a step S3. If the DC current is present, the steps S2 and S3 are repeated. Thus, while the message telephone occupies the line, the loop of the steps S2 and S3 is repeated to check the presence of the CNG signal. When at the step S3 no DC current is detected, it indicates-that the message telephone unit has released the line, the sequence returns to a stand-by state in the step S1.

As explained in the foregoing, a current sensor of satisfactory linearity which employs a coil and a Hall effect element respectively in the input and output sides, is positioned between the line connecting terminals and the message telephone unit connecting terminals to output the DC current signal and the CNG signal by said single current sensor. Thereby, a transformer is not used so that cost reduction and compactization of the apparatus can be realized.

Also the use of a coil in the input side of the current sensor 402 allows reduction of an input DC resistance in comparison with the case of employing an LED, and also provides stable performance since the DC resistance has no dependency on the current as in the case of LED.

The above-explained embodiment employs a CNG detector, but there may also be employed a detector for a single frequency. For example, if there is employed a detector for a CED signal (identification of a called station) of 2100 Hz, a CED signal is issued from a facsimile apparatus of a called station which automatically responds to a call from the telephone unit connected between the terminals T1, T2, and the CNG detected detects the CED signal, whereupon the CML relay is activated to shift from a telephone unit side to a modem side to effect facsimile communication. In such embodiment if the telephone unit connected to the terminals T1, T2 is distant from the facsimile apparatus, the manipulation of the console panel of said facsimile apparatus by an operator can be abbreviated.

Furthermore, the CNG detector may be replaced by a receiver for a DTMF (dual tone multi frequency) signal which is one of selection signals for the telephone unit.

In this manner, when a facsimile apparatus at a destination station lacks a function of sending the CNG signal, an automatic response and facsimile communication of the present apparatus can be conducted by having the facsimile apparatus activated after the transmission of a DTMF signal from the telephone unit at the destination station.

Also the current sensor can detect not only a voice band signal from the destination station but also that from the telephone unit connected to the terminals T1, T2. Consequently, in case the operator responds to an incoming call by hooking off the handset of the telephone unit connected to the terminals T1, T2 and identifies a caller as a facsimile apparatus, the operator can emit the DTMF signal to initiate the facsimile communication. Such operation is convenient when the telephone unit is distant from the facsimile apparatus.

Figure 8:
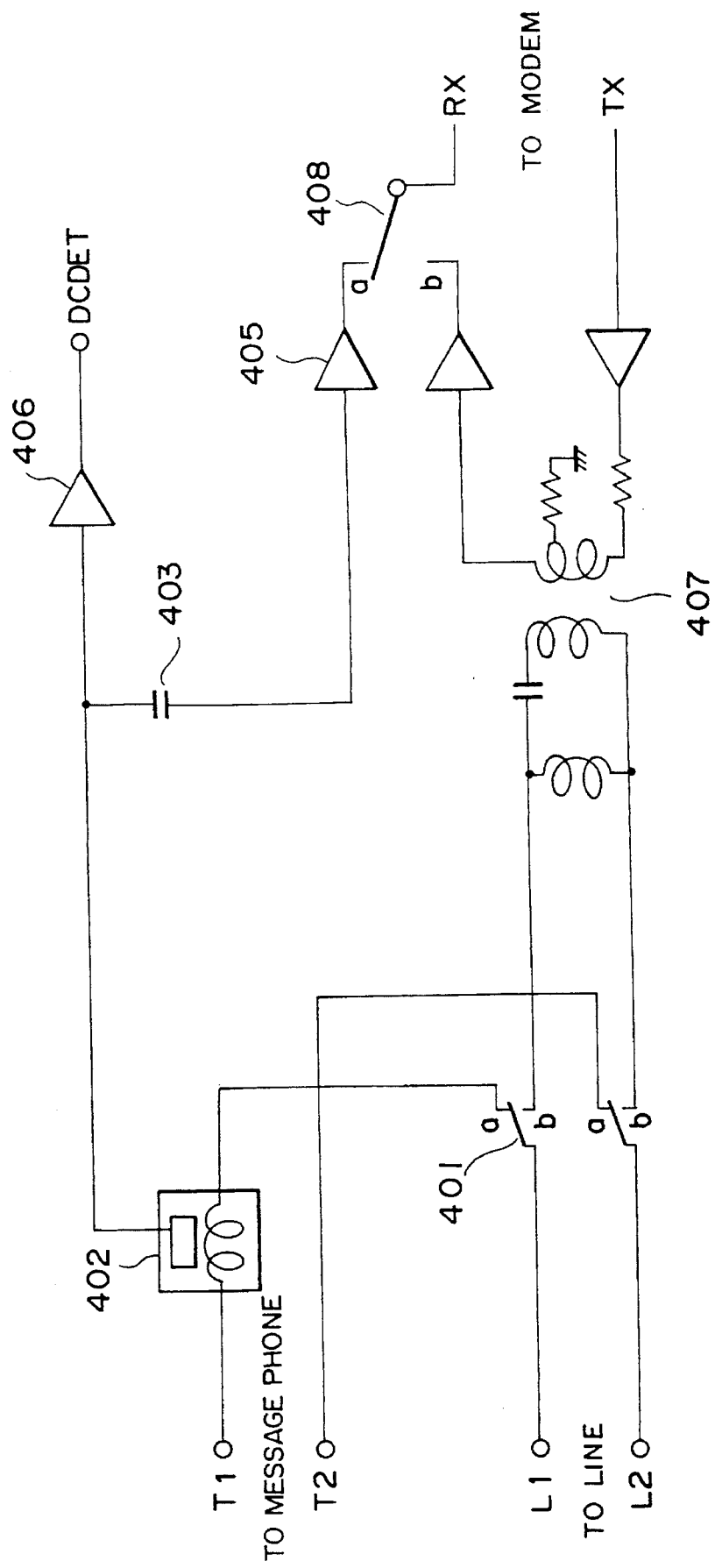
FIG. 8 is a circuit diagram showing another structure of the network control unit.

Furthermore, as a recent modem has a function for detecting a single frequency or a DTMF signal, a CNG detection circuit may be dispensed with as shown in FIG. 8.

Referring to FIG. 8, an output of a current sensor 402 is divided into two, one of which is supplied to a comparator 406 to provide a DCDET signal indicating the presence or absence of a DC current. The other is supplied through a coupling capacitor 403 and an amplifier 405 to a switch 408, which comprises a relay or an analog switch controlled by the controller 201.

In such circuit structure, the voice and signals (CNG, CED, DTMF, etc.) on the line can be detected by the modem, by setting both the CML relay 401 and the switch 408 to a side a. Also the facsimile communication can be achieved by switching both the CML relay 401 and the switch 408 at a side b. Such circuit structure, allows dispensing with the CNG detector, etc. can reduce the dimension and cost of the apparatus.

As explained in the foregoing, a current sensor having satisfactory linearity between input and output sides, is positioned between the line connecting terminals and the message telephone unit connecting terminals of the facsimile apparatus, for detecting the presence or absence of a DC component and a voice band signal (CNG signal) by said current sensor, so that the transformer is dispensed with in the facsimile apparatus, thereby reducing the cost and dimension thereof.

The present invention is applicable not only to a facsimile apparatus but also to various communication apparatus such as a teletex machine or a message telephone unit.

Also the present invention is not limited to the foregoing embodiments but is subject to various modifications.

What is claimed is:

1. A communication apparatus comprising:

extracting means including a coil and a conversion element for converting a magnetic field generated by said coil into a current, said extracting means being adapted to extract an AC signal on a communication line;

detecting means connected to said extracting means for detecting a predetermined signal indicating data communication on a basis of the AC signal; and control means for controlling a data communication operation in accordance with the detection by said detection means, wherein said control means is adapted to judge a status of the communication line in accordance with the current of said conversion element.

2. An apparatus according to claim 1, wherein the predetermined signal is a CNG signal.

3. An apparatus according to claim 1, wherein said extracting means includes a capacitor for extracting the AC signal from the current which is obtained through conversion by said conversion element.

4. An apparatus according to claim 1, further comprising connecting means for connecting the communication line to a telephone set or a modem, wherein said extracting means is connected between said connecting means and said telephone set.

5. An apparatus according to claim 1, wherein said conversion element includes a Hall effect device.

6. An apparatus according to claim 1, wherein said control means controls an image data communication operation in accordance with the detection by said detecting means.

7. An apparatus according to claim 1, wherein said extracting means further extracts a DC signal on the communication line, and said control means controls the communication operation in accordance with the detection by said detecting means and the DC signal from said extracting means.

8. A communication apparatus comprising:

data communicating means for performing data communication via a data communication line;

a coil for generating a magnetic field according to a first current on the communication line;

a conversion element for converting a change in the magnetic field generated by said coil into a second current;

extracting means for extracting an AC signal from the second current obtained through conversion by said conversion element;

first detecting means for detecting a state of the communication line in accordance with the second current from said conversion element;

second detecting means for detecting a signal related to data communication in accordance with the AC signal from said extracting means; and control means for controlling a data communication operation by said data communicating means in accordance with detections by said first detecting means and said second detection means.

9. An apparatus according to claim 8, wherein said first detecting means detects a state of a DC loop of the communication line.

10. An apparatus according to claim 9, wherein said second detecting means detects a CNG signal.

11. An apparatus according to claim 8, wherein said extracting means includes a capacitor for extracting the AC signal from the second current which is obtained through conversion by said conversion element.

12. An apparatus according to claim 8, wherein said conversion element includes a Hall effect device.

13. An apparatus according to claim 8, wherein said data communication means performs an image data communication.

14. A communication apparatus comprising:

first connecting means for connecting a communication line;

second connecting means including a first contact for connecting said first connecting means, a second contact for connecting a telephone set and a third contact for connecting recording means, said second connecting means being adapted for connecting the communication line to either the telephone set or said recording means; and extracting means for extracting a first speech signal on a line between said first connecting means and said first contact, wherein said recording means is operative, in an automatic mode, to record a second speech signal entered from the third contact, and in a manual mode, to record the first speech signal extracted by said extracting means.

15. An apparatus according to claim 14, wherein said extracting means includes a coil for generating a magnetic field according to the first speech signal on the line between said first connecting means and said first contact, and a conversion element for converting the magnetic field generated by said coil into a third speech signal, and wherein said recording means records in the manual mode the third speech signal obtained through conversion by said conversion element as the first speech signal.

16. An apparatus according to claim 14, wherein said recording means captures in the automatic mode the communication line in accordance with an incoming call.

17. A communication apparatus comprising:

connecting means for connecting a communication line to either a data communication unit or a telephone set;

first detecting means for detecting a hook state of the telephone set on a basis of a first current of the communication line, said first detecting means including a coil and a conversion element for converting into a second current a change in a magnetic field generated in accordance with the first current by means of said coil second detecting means for detecting a signal related to data communication on a basis of the second current from the conversion element; and control means for controlling said connecting means in accordance with the detection by said second detecting means.

18. An apparatus according to claim 17, wherein said second detecting means comprises extracting means for extracting an AC signal from the second current which is obtained through the conversion by said conversion element, and said second detecting means the signal related to data communication from the AC signal.

19. An apparatus according to claim 18, wherein said second detecting means detects a CNG signal.

20. An apparatus according to claim 17, wherein said first detecting means is connected between said connecting means and the telephone set.

21. An apparatus according to claim 17, wherein said conversion element includes a Hall effect device.

22. An apparatus according to claim 17, wherein said data communication unit performs an image data communication.

23. A line polarity inversion detecting apparatus comprising:

a coil for generating a magnetic field according to a first current on a communication line;

a conversion element for converting the magnetic field generated by said coil into a second current; and detecting means for detecting a line polarity inversion in accordance with the second current.

24. An apparatus according to claim 23, wherein said detecting means comprises comparing means for comparing the second current with a predetermined signal.

25. An apparatus according to claim 23, wherein said detecting means comprises a first comparator for comparing the second current with a first predetermined signal, and a second comparator for comparing the second current with a second predetermined signal.

26. A communication apparatus comprising:

detecting means, including a coil and a conversion element for converting a magnetic field generated by said coil into a current, for detecting a line polarity inversion and control means for controlling a communication operation in accordance with the current from said detecting means.

27. An apparatus according to claim 26, wherein said detecting means comprises comparing means for comparing the current with a predetermined signal.

28. An apparatus according to claim 26, wherein said detecting means comprises a first comparator for comparing the current with a first predetermined signal, and a second comparator for comparing the current with a second predetermined signal.

29. An apparatus according to claim 26, wherein said control means effects the communication operation in accordance with the current from said detecting means.

30. An apparatus according to claim 26, wherein said control means controls an image data communication operation in accordance with the current from said detecting means.

* * * * *

UNITED STATES PATENT AND TRADEMARK OFFICE
CERTIFICATE OF CORRECTION

PATENT NO. : 5,526,420

DATED : June 11, 1996

INVENTORS : TSUNEHIRO WATANABE ET AL.

It is certified that error appears in the above-identified patent and that said Letters Patent is hereby corrected as shown below:

COLUMN 1

Line 33,   "done" should be deleted.

COLUMN 2

Line 11,   "signal-CNG" should read --signal CNG--.

COLUMN 3

Line 62,   "an" should be deleted.

COLUMN 4

Line 23,   "an" should read --a--;
   Line 48,   "reception" should read --reception of--.

COLUMN 6

Line 17,   "10" should be deleted.
   Line 25,   "following" should read --following,--.

UNITED STATES PATENT AND TRADEMARK OFFICE
CERTIFICATE OF CORRECTION

PATENT NO. : 5,526,420

DATED : June 11, 1996

INVENTORS : TSUNEHIRO WATANABE ET AL.        Page 2 of 2

It is certified that error appears in the above-identified patent and that said Letters Patent is hereby corrected as shown below:

COLUMN 7

Line 51,  "indicates-that" should read --indicates that--.

COLUMN 8

Line 64,  "apparatus" (second occurrence) should read --apparatuses--.

COLUMN 10

Line 44,  "coil" should read --coil;--.

Signed and Sealed this

Fifteenth Day of October, 1996

Attest:

BRUCE LEHMAN

Attesting Officer    Commissioner of Patents and Trademarks